United States Patent [19]
Tani

[11] Patent Number: 5,940,353
[45] Date of Patent: Aug. 17, 1999

[54] DRIVING DEVICE FOR A RECORDABLE OR A REWRITABLE DISK

[75] Inventor: Takao Tani, Fujiidera, Japan

[73] Assignee: Funai Techno-Systems Co., Ltd., Daito, Japan

[21] Appl. No.: 09/084,793

[22] Filed: May 27, 1998

[30] Foreign Application Priority Data

Jul. 3, 1997 [JP] Japan ............................. 9-005766 U

[51] Int. Cl.⁶ .................................................. G11B 17/22
[52] U.S. Cl. ................................................. 369/32; 369/47
[58] Field of Search ............................. 369/32, 33, 47, 369/48, 54, 58; 386/125, 126

[56] References Cited

U.S. PATENT DOCUMENTS

| | | |
|---|---|---|
| 5,289,450 | 2/1994 | Mizumoto et al. ........................ 369/32 |
| 5,295,126 | 3/1994 | Okano et al. ............................. 369/47 |
| 5,471,441 | 11/1995 | Nonaka et al. .......................... 369/32 |
| 5,561,649 | 10/1996 | Lee et al. ................................. 369/32 |
| 5,721,856 | 2/1998 | Takeuchi ................................. 369/32 |
| 5,831,950 | 11/1998 | Furukawa ............................... 369/47 |

*Primary Examiner*—Tan Dinh
*Attorney, Agent, or Firm*—Morgan, Lewis & Bockius LLP

[57] ABSTRACT

A disk drive of a driving device for a CD-R (compact disk recordable) disk or a CD-RW (CD-rewritable) disk, when a read-out error occurs due to a data mismatch in the PMA (program memory area) of the CD-R disk, it saves the address information concerning a start and a stop of a readable track which is recorded in the PMA, accesses a corresponding track based on the saved address information, reads out data of the accessed track, and then, records the read-out data in a new CD-R disk. Thereby, the larger amount of data can be recovered even if an error occurs in reproducing during the reading of the PMA of a recordable disk or a rewritable disk.

7 Claims, 4 Drawing Sheets

DRIVING DEVICE FOR A RECORDABLE OR A REWRITABLE DISK

BACKGROUND OF THE INVENTION

This invention relates to a disk driving device enabling the recording and reproducing of data on and from a user data area of a recordable disk or a rewritable disk such as CD-R (compact disk recordable), CD-RW (compact disk rewritable), MD (mini disk), DVD-RAM (digital video disk random access memory) and the like.

There has been provided a CD-R driving device which reads out and writes data from and on a CD-R disk (write-once CD) that is one type of a write-once optical disk. The conventional CD-R driving device records various data in a track form on a user data area known as a program area of the CD-R disk, and reproduces the recorded data. The CD-R driving device of this sort writes address information concerning tracks such as a starting time and a stopping time of the track before or after recording the data, on a program memory area (hereinafter referred to as a PMA) which is located at an inner radius of the disk. Besides, in a CD-RW (CD rewritable) driving device for a CD-RW disk, data is capable of being repeatedly written and erased in the CD-RW disk.

When the CD-R disk is loaded in the above-mentioned CD-R driving device, a CD-R drive collects address information concerning the tracks existing in the PMA of the CD-R disk, thereby the CD-R drive recognizes address information concerning all the tracks on the disk, and then, prepares to record and reproduce the data on and from the track based on the address information. The address information concerning the tracks is recorded in the PMA at sector by sector.

Conventionally, when the CD-R drive reads out the PMA or another area in a procedure of collecting the address information concerning tracks at the time of loading the disk, and if an error occurs in reproducing of the address information due to a data mismatch caused by dust and the like, the reproducing process is quit at the time of the error-occurred sector detected. In addition, since the CD-R drive cannot obtain the address information concerning all the tracks on the disk with the error, the disk is disabled from being used with prohibited from reproducing and recording in the tracks.

In this conventional CD-R driving device wherein the PMA cannot be reproduced in the above-mentioned case, data may not be recorded in the disk, or already-recorded data in the disk cannot be reproduced, which makes the disk disabled from being used, or the memory area of disk media disabled from being effectively used. In order to cope with this problem, there has been provided a device in which data can be recorded and reproduced even if an error occurs in reproducing during the reading of the PMA (e.g., refer to the Japanese Patent Laid-Open Publication No. 9-55033).

However, the above-mentioned device generates the address information which has been unable to be reproduced, based on the address information existing in the TOC (table of contents) which is recorded in the lead-in area of the CD-R disk. Therefore, even though there are the readable information in the PMA, these information cannot effectively be used. Hence, the amount of reproducible data is limited.

SUMMARY OF THE INVENTION

This invention is made to solve the above-mentioned problems. One object of the present invention is to provide a disk driving device which has the capability of recovering the larger amount of data, and enables a disk in which a read-out error occurred to be recorded and reproduced even if the error occurred in reproducing during the reading of the PMA of the recordable disk or rewritable disk.

In accomplishing the above-described object, according to one aspect of the present invention, a disk driving device having a disk drive which records and reproduces data on and from a user data area of a recordable disk, comprises: a saving means for saving information concerning a start and a stop of a readable track which has been recorded in a program memory area of said recordable disk when address information concerning tracks recorded in the program memory area of said recordable disk, is not reproduced due to an error at the time of collecting the address information concerning the tracks in said user data area following loading of the recordable disk into the disk drive; a reading-out and storing means for accessing a corresponding track based on the information concerning a start and a stop of the track which is saved by said saving means, and then reading out and storing data of the accessed track; and, a recording means for recording the data read out and stored by said reading-out and storing means into a new recordable disk.

According to another aspect of the present invention, a disk driving device having a disk drive which records and reproduces data on and from a user data area of a rewritable disk, comprises: a saving means for saving information concerning a start and a stop of a readable track which has been recorded in a program memory area of said rewritable disk when address information concerning tracks recorded in the program memory area of said rewritable disk, is not reproduced due to an error at the time of collecting the address information concerning the tracks in said user data area following loading of the rewritable disk into the disk drive; a reading-out and storing means for accessing a corresponding track based on the information concerning a start and a stop of the track which is saved by said saving means, and then reading out and storing data of the accessed track; and, a recording means for recording each of information in a program memory area, TOC of a lead-in area, and a user data area of said rewritable disk based on the data read out and stored by said reading-out and storing means.

DETAILED DESCRIPTION OF THE PREFERRED EMBODIMENT OF THE PRESENT INVENTION

This application is based on Utility Model Application No. 9-5766 filed in Japan, the contents of which are hereby incorporated by reference.

This invention will be described in further detail by way of example with reference to the accompanying drawings.

Figure 1:
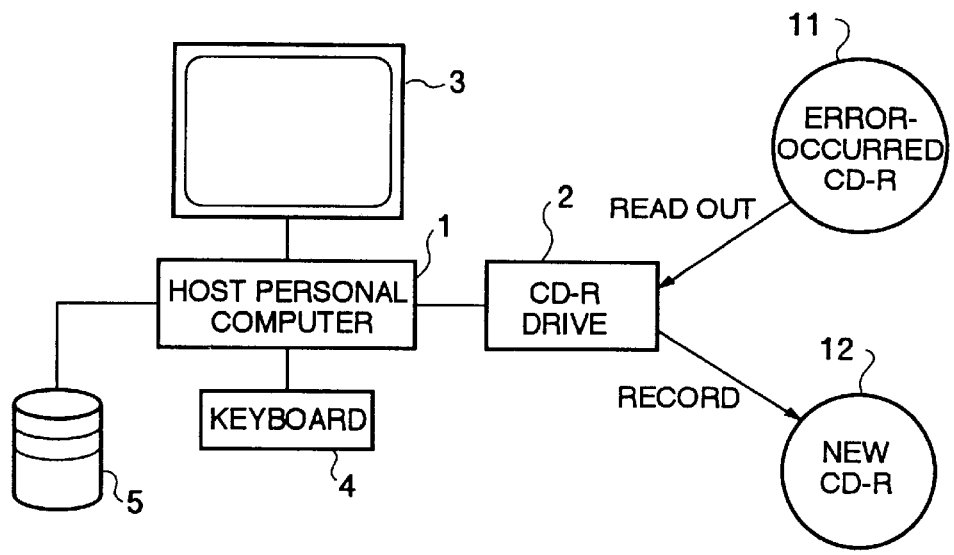
FIG. 1 is a schematic structural view showing a system of a CD-R (CD recordable) disk driving device according to one embodiment of the present invention.

FIG. 1 is a schematic structural view showing a system of a disk driving device according to one embodiment of the present invention. The disk driving device is provided with a host personal computer 1 which controls the entire system and performs predetermined computations and the like. The host personal computer 1 is connected with a CD-R (CD recordable) drive 2 for reading out (reproducing) or writing (recording) data from and on a CD-R disk (often known as a write-once CD, one type of recordable disk), a display unit 3 comprising a CRT (cathode ray tube) display, a keyboard 4 (or a mouse) acting as an input unit, and a hard disk 5 in which data are stored.

The host personal computer 1 which contains a built-in CPU (central processing unit), a built-in RAM (random access memory) which memorizes data-storage device information for writing in a CD, and a built-in ROM (read only memory) in which programs are stored. The host personal computer 1 controls the CD-R drive 2 with a program which corresponds to a command input through the keyboard 4. The CD-R drive 2, itself comprising the built-in CPU and the built-in RAM, carries out the transmitting of data, and the producing and reading-out of a CD-R disk. Especially in the device of this invention, the CD-R drive 2 reads out a CD-R disk 11 in which a read-out error occurred, and records data into a new CD-R disk 12. The host personal computer 1 and a CD-R drive 2 achieve claimed functions of a saving means, a reading-out means and a recording means, and the hard disk 5 achieves a function of a storing means.

Figure 2:
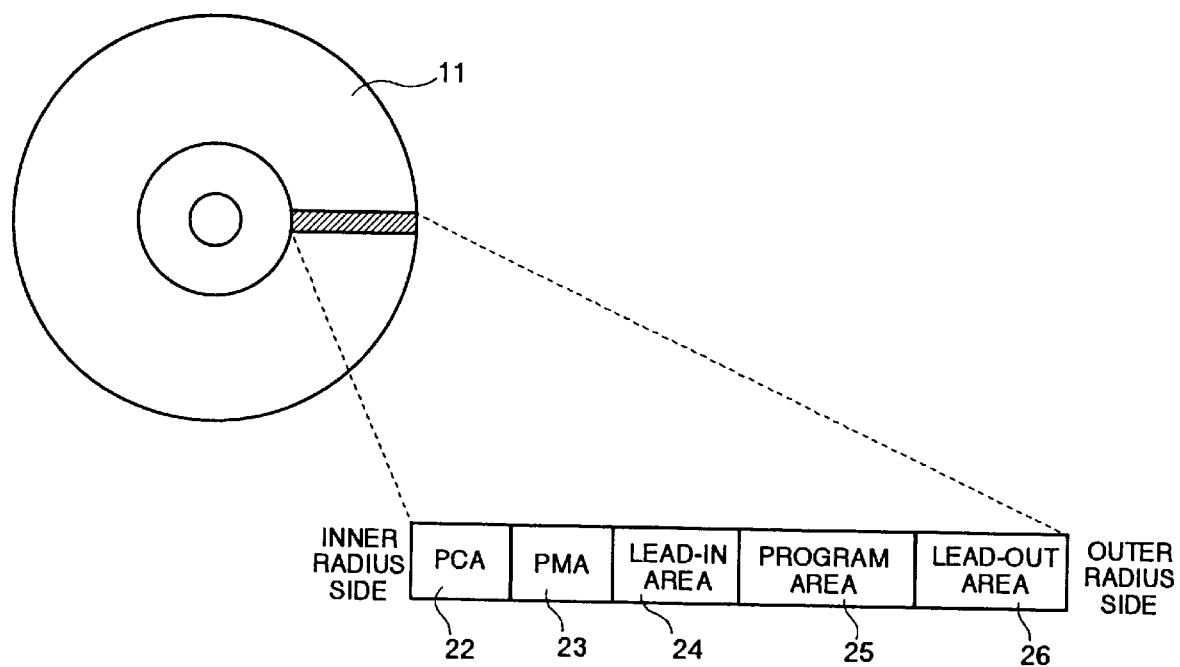
FIG. 2 is a view showing an example of a format for a CD-R disk to be loaded into the CD-R disk driving device shown in FIG. 1.

FIG. 2 is a view showing an example of a format for a CD-R disk 11 to be loaded into the CD-R disk driving device shown in FIG. 1. The CD-R disk 11 includes a structure composed of a PCA (power calibration area) 22, a PMA (program memory area) 23, a lead-in area 24, a program area 25 and a lead-out area 26 which are arranged from an inner radius side to an outer radius side. The figure shows a magnified view of the structure.

Figure 3:
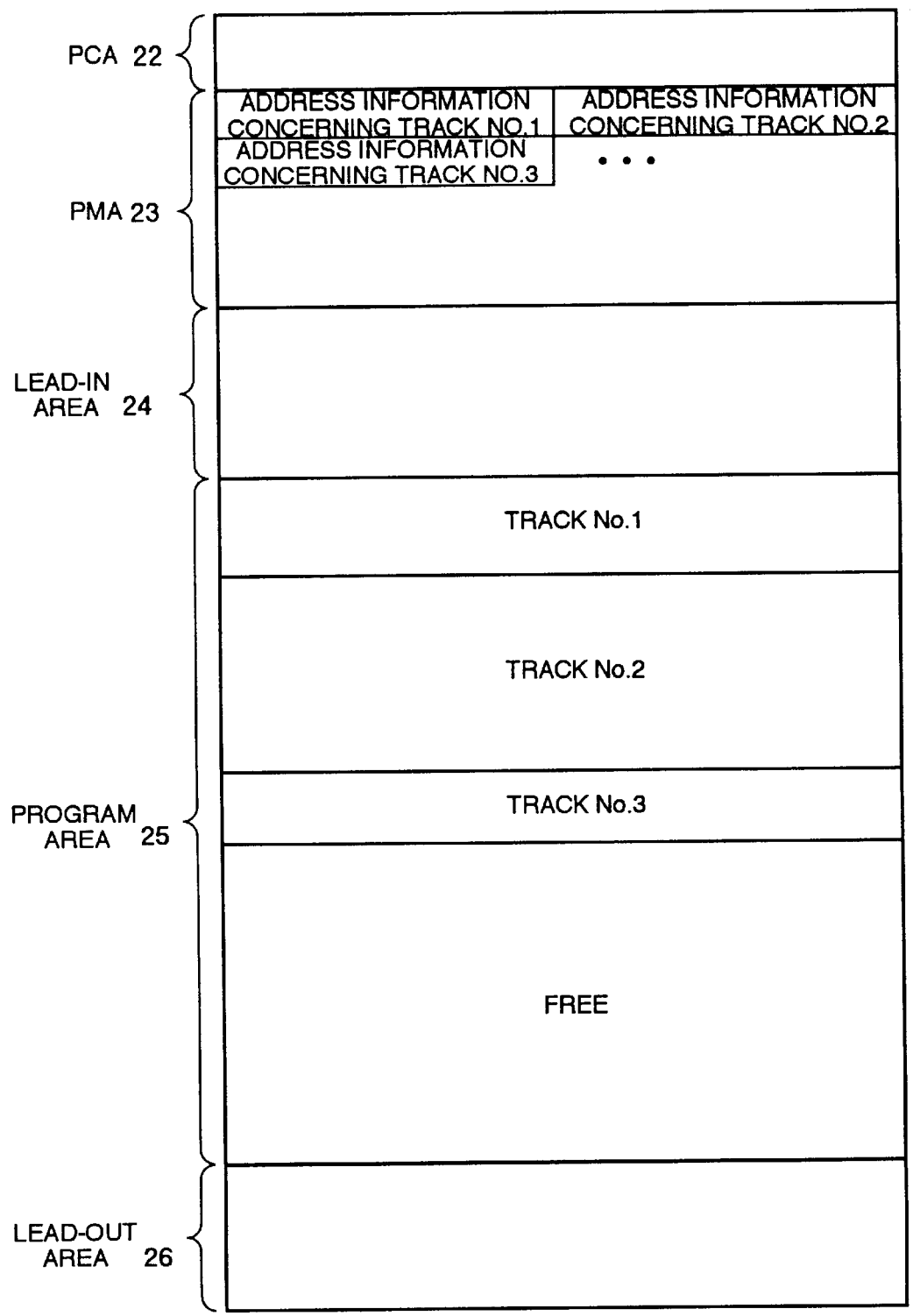
FIG. 3 is a view showing an example of a format for track information in a PMA (program memory area) of the CD-R disk shown in FIG. 2.

FIG. 3 is a view showing an example of a format for track information in the PMA 23 of the CD-R disk shown in FIG. 2. The PCA 22 is an area in which the writing power for recording data is calibrated. The PMA 23 is an area in which address information concerning tracks are recorded before or after the data are recorded in the tracks. The lead-in area 24 is an area in which TOC (table of contents) information as session information including track numbers and the starting times of the tracks are recorded. The program area (or a user data area) 25 has a plurality of tracks in which various data are recorded. The lead-out area 26 is an area representing the last part of the session.

In response to a command from the host personal computer 1, the CD-R drive 2 collects the address information concerning the tracks in the user data area immediately after the CD-R disk 11 is loaded. At the time, if an error occurs in reproducing due to a mismatch of the address information which is recorded on the PMA of the CD-R disk 11, it makes a reading-disabled state in the conventional system. On the other hand, the device of the present invention has a function for recovering the data by means of a procedure for saving information concerning the starting and ending of the tracks out of readable information in PMA, accessing the corresponding track based on the saved information, reading out data of the accessed track, storing it in the hard disk 5, and then recording the stored data in the new CD-R disk 12.

Figure 4:
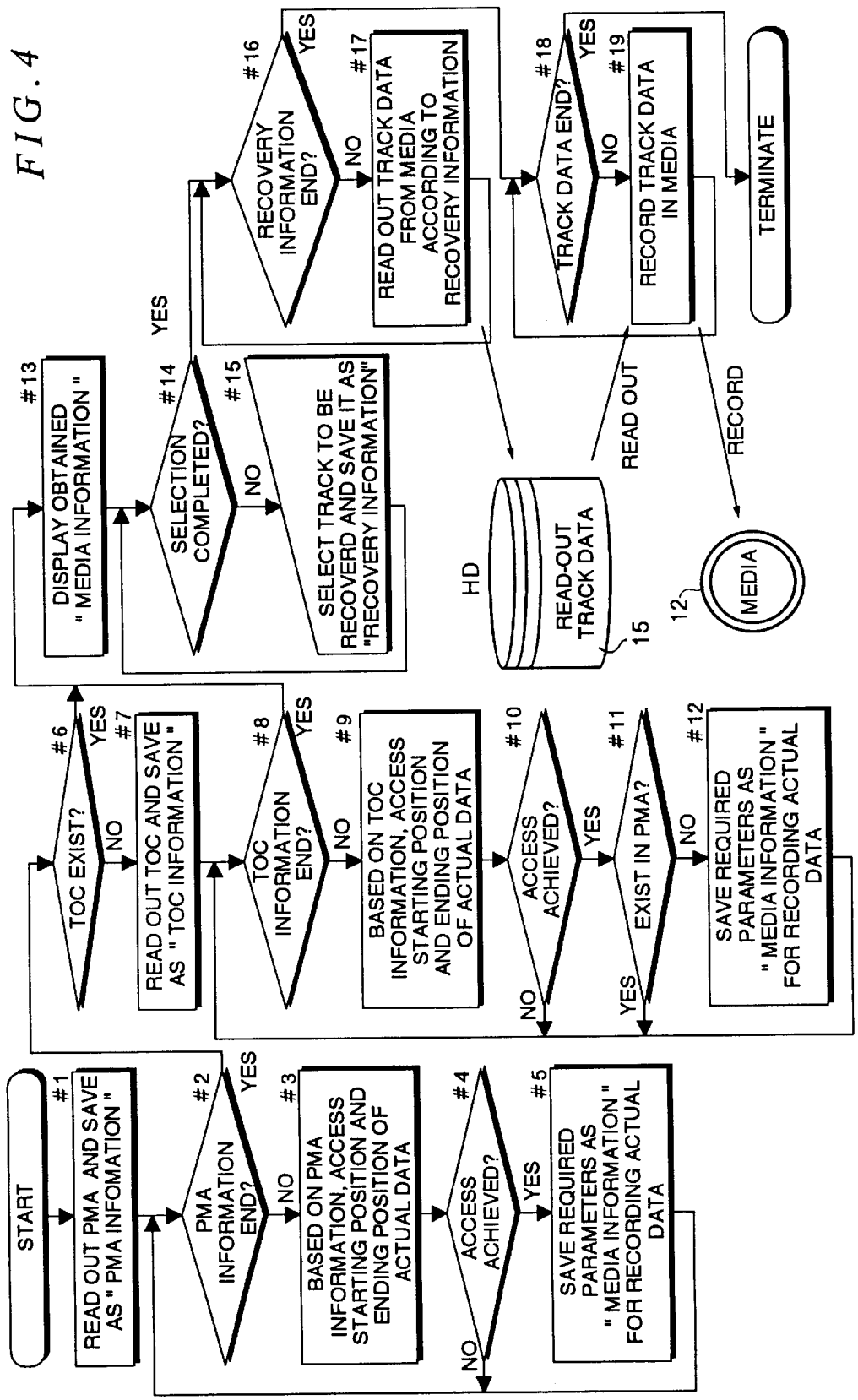
FIG. 4 is a flowchart of the procedure for a data recovery by the host personal computer and a CD-R drive, and, FIG. 5 is a schematic structural view showing a system of a CD-RW (CD rewritable) disk driving device which records and reproduces data on and from a CD-RW disk.

FIG. 4 is a flowchart of the procedure for a data recovery by the host personal computer 1 and the CD-R drive 2. As shown in the figure, the procedure starts with reading out the PMA of the CD-R disk 11 in which a read-out error occurred, and saving it as "PMA information" (#1). If the PMA information is not ended (NO at #2), the procedure goes on to a step for accessing the starting and ending position of actual data based on the saved PMA information (#3). If the access is achieved (YES at #4), parameters and track numbers that are required information for recording the actual data, are saved as "media information (address of track)" (#5). At this stage, other information are abandoned. On the other hand, if the PMA information is ended (YES at #2), it is examined whether the TOC exists or not (#6). When the TOC exists, the TOC is read out, and saved as "TOC information" (#7). When the TOC is not ended (NO at #8), the procedure goes on to a step for accessing the starting and ending position of actual data based on the saved TOC information (#9). If it has accessed (YES at #10), it is examined whether the track information relating to the actual data has also existed in PMA (#11). If not, parameters that are required information for recording the actual data, are saved as "media information (address of track)" (#12).

When the TOC information is ended (YES at #8), obtained "media information" are displayed on the display unit (#13). Then, it is examined whether a selection is completed by a user (#14). If not, the procedure advances to a step of selecting a track to be recovered and saving the track as "recovery information" (#15). If it is determined that the selection is completed by a user, until the recovery information comes to an end (NO at #16), the track data is read out according to the recovery information (#17). The read-out track data is stored in the hard disk 5. When the recovery information is ended (YES at #16), the track data stored in the hard disk 5 is read out until the track data comes to a next end (NO at #18), and then, the read-out data is recorded in the new CD-R disk (media) 12 (#19). The procedure is terminated by the ending of the track data. Owing to this procedure, the disk driving device of the present invention is capable of recovering the larger amount of data than the conventional drive.

Figure 5:
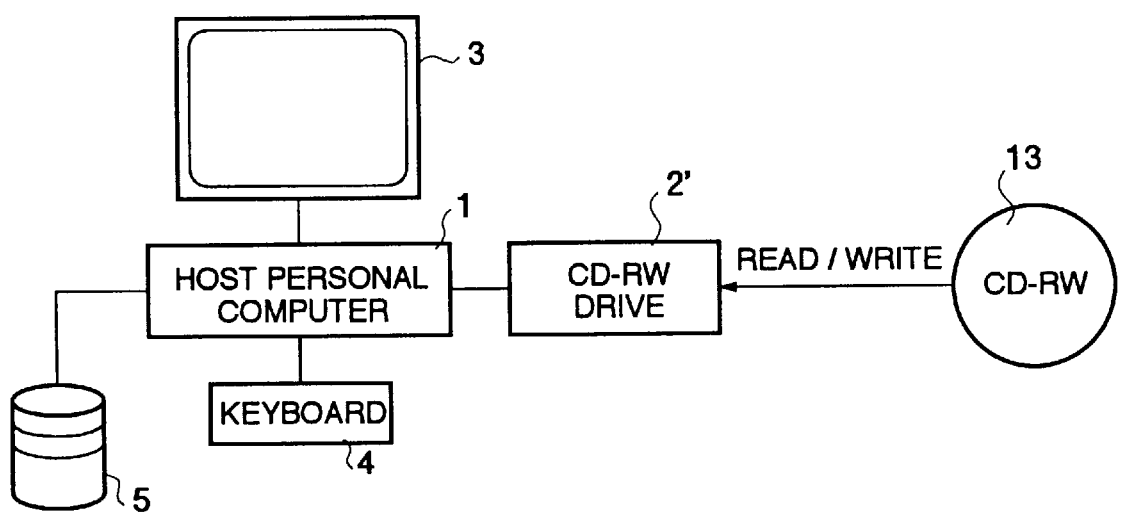

FIG. 5 is a schematic structural view showing a system of a disk driving device for recording and reproducing data on and from a CD-RW disk according to the present invention. In the system shown in the figure, a CD-RW drive 2' records and reproduces data on and from a CD-RW disk 13 in which data is capable of being written in and erased plural times. As in the case with the CD-R disk, the CD-RW drive 2' writes the data in the CD-RW disk 13 by means of a procedure of obtaining an address in which the data is to be written, writing said data in a position corresponding to the address, and renewing data in PMA.

In the CD-RW disk 13, if an error occurs in reproducing due to a mismatch of the address information concerning tracks which is recorded in the PMA, data is also recovered by the procedure described in the case with the CD-R disk. However, a point which is distinguished from the above-described CD-R drive is that the CD-RW drive 2', based on the read out and stored data of the accessed track, overwrites each information in a program-memory area, TOC of a lead-in area, and a user data area of the CD-RW disk 13. Thus, the CD-RW disk is capable of being reproduced, which makes it possible to read out the media that has been unable to be read out.

The present invention is not restricted to the above-described embodiment, but includes varied or modified embodiments from the above. While the present invention is applied to the CD-R and the CD-RW disk in the above-discussed embodiments, it can widespreadly be embodied in a MD, DVD-RAM and the like.

What is claimed is:

1. A disk driving device having a disk drive which records and reproduces data on and from a user data area of a recordable disk, comprising:

a saving means for saving information concerning a start and a stop of a readable track which has been recorded in a program memory area of said recordable disk when address information concerning tracks recorded in the program memory area of said recordable disk, is not reproduced due to an error at the time of collecting the address information concerning the tracks in said user data area following loading of the recordable disk into the disk drive;

a reading-out and storing means for accessing a corresponding track based on the information concerning a start and a stop of the track which is saved by said saving means, and then reading out and storing data of the accessed track; and, a recording means for recording the data read out and stored by said reading-out and storing means into a new recordable disk.

2. A disk driving device as claimed in claim 1, wherein said saving means saves the address information concerning a start and a stop of a readable track which is recorded in a program memory area of a recordable disk, following which, said saving means reads out table of contents (TOC) recorded in a lead-in area, and saves an address information concerning a start and a stop of a readable track in said TOC.

3. A disk driving device as claimed in claim 1, wherein said reading-out and storing means includes a hard disk for storing data of the accessed track, and said recording means reads out the track data stored in said hard disk, and records the data into a new recordable disk.

4. A disk driving device as claimed in claim 1, wherein the recordable disk is a CD-R (recordable) disk.

5. A disk driving device having a disk drive which records and reproduces data on and from a user data area of a rewritable disk, comprising:

a saving means for saving information concerning a start and a stop of a readable track which has been recorded in a program memory area of said rewritable disk when address information concerning tracks recorded in the program memory area of said rewritable disk, is not reproduced due to an error at the time of collecting the address information concerning the tracks in said user data area following loading of the rewritable disk into the disk drive;

a reading-out and storing means for accessing a corresponding track based on the information concerning a start and a stop of the track which is saved by said saving means, and then reading out and storing data of the accessed track; and, a recording means for recording each of information in a program memory area, TOC of a lead-in area, and a user data area of said rewritable disk based on the data read out and stored by said reading-out and storing means.

6. A disk driving device as claimed in claim 5, wherein said reading-out and storing means includes a hard disk for storing data of the accessed track, and said recording means reads out the track data stored in said hard disk, and overwrites the data into the rewritable disk.

7. A disk driving device as claimed in claim 5, wherein the rewritable disk is a CD-RW (rewritable) disk.

* * * * *